Feb. 14, 1928.

H. BEISSER 1,659,187

KEY MACHINE

Filed March 16, 1923     4 Sheets-Sheet 1

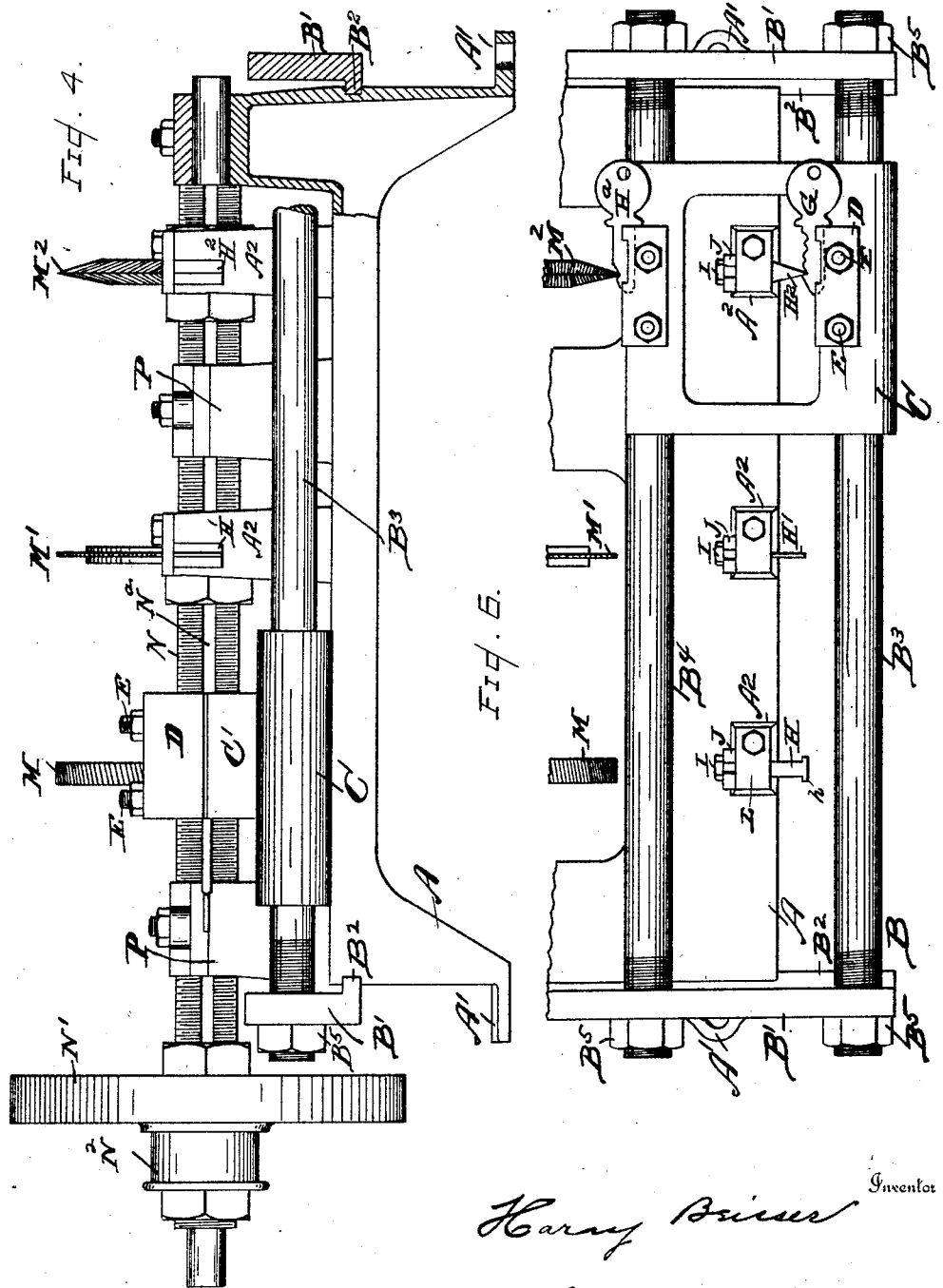

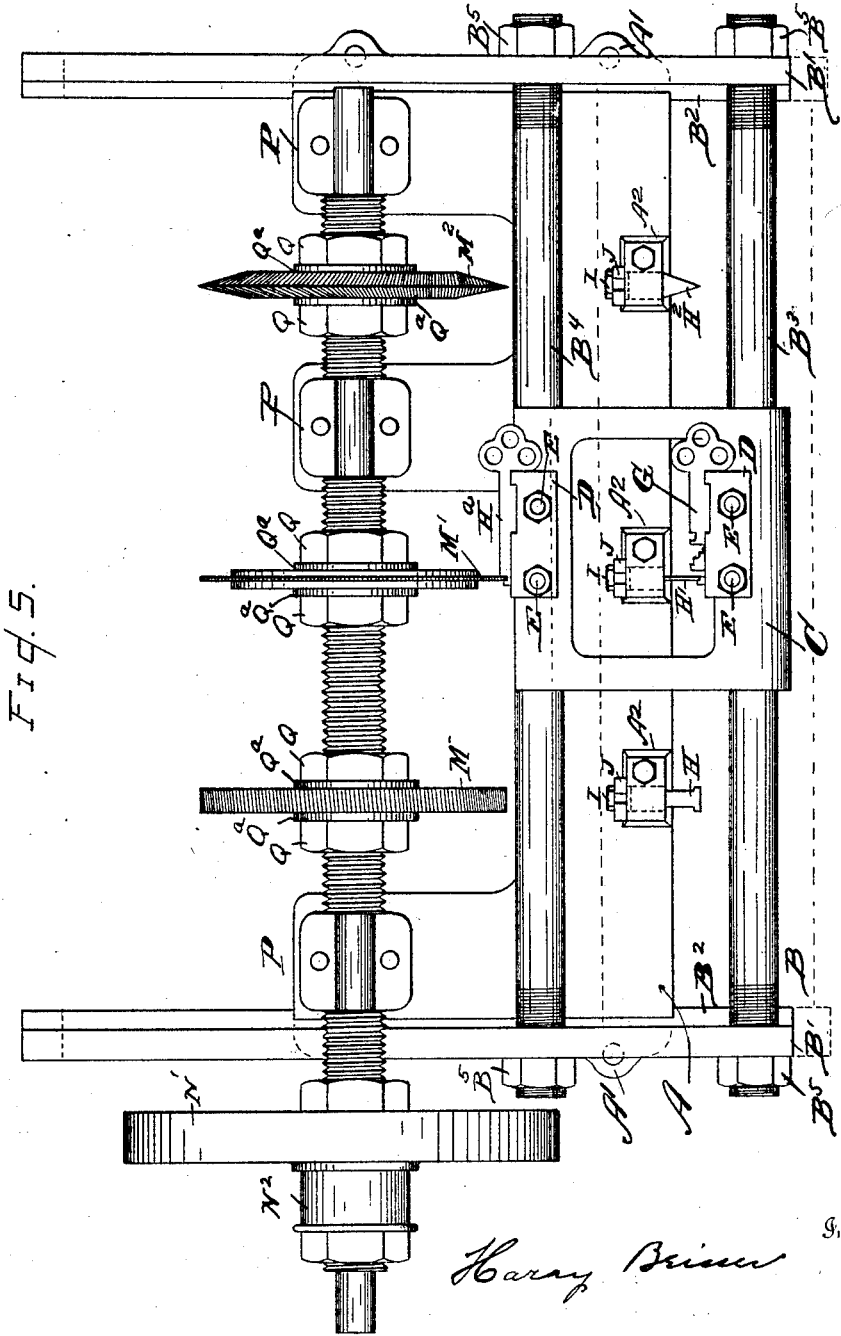

Patented Feb. 14, 1928.

1,659,187

UNITED STATES PATENT OFFICE.

HARRY BEISSER, OF DETROIT, MICHIGAN.

KEY MACHINE.

Application filed March 16, 1923. Serial No. 625,453.

My invention relates to a machine for duplicating keys shown in the accompanying drawings and more particularly described in the following specification and claims.

The primary object of this invention is to provide a machine in which keys of different character,—for example the ordinary malleable door key, also flat and so called "Yale" keys may be quickly and readily duplicated at a minimum expenditure of time and effort.

One of the objects of this invention is to provide a device adapted to support a template or master key and also a key blank, the arrangement being such that upon following the notches in the master key with a suitable stylus or guiding member, a co-operating cutting tool connected therewith will cut a similar notch or recess in the key blank.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification and forming part thereof:

Figure 4 is a side elevation of the machine with parts broken away and in section.
Figure 5 is a plan view of the machine showing the combined master key and key blank clamping member engaging a flat master key or template and a correspondingly flat key blank, in position to be acted upon by the guide or stylus member and the co-operating circular saw or cutter;—the top plates of the bearings for the threaded shaft being removed to show that the shaft is screw threaded only between bearings.

Figure 6 is a fragmentary plan view of the machine showing the slidable key and blank clamping member carrying a "Yale" master key and a corresponding key blank in position to be operated upon by the V-shaped stylus or guide and the corresponding cutting tool.

Referring now to the letters of reference placed upon the drawings:

A indicates the bed frame of the machine provided with lugs $A^1$, by which it may be bolted to a table, bench or other suitable support.

B is a frame adapted to slide laterally in the bed-frame A, constructed of a pair of rails $B^1$, $B^1$, having inwardly directed flanges $B^2$ extending into transverse grooves in the end walls of the bed-frame. The rails $B^1$, $B^1$, are coupled together by rods $B^3$, $B^4$, tapped at each end to receive nuts $B^5$ by which they are secured to the flanged rails.

Figure 3:
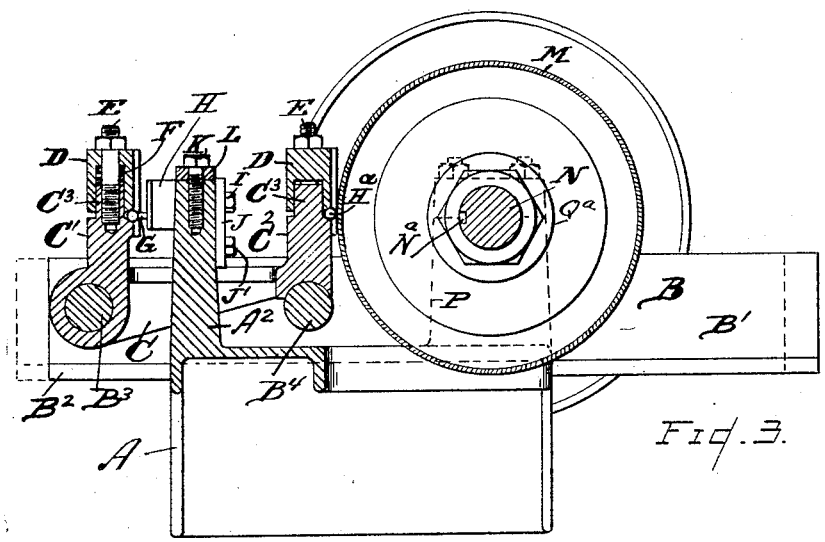
Figure 3 is a vertical cross-sectional view taken on or about line 3—3 of Figure 1.

C denotes a slidable carriage pivoted upon the outer rod $B^3$, its free end resting upon the adjacent inner parallel rod $B^4$,—see Figure 3. Extending upwardly from the carriage C are posts $C^1$, $C^2$, each terminating in a reduced portion $C^3$ upon which are mounted cap plates D, secured to the post by bolts E which are adapted when adjusted to regulate the tension of a spring F sleeved upon the bolt and bearing upon the end of the posts and against the respective caps.

G indicates a master or template key held between a shoulder formed by the off-set portion of the post and the lower edge of the cap plates D, by adjusting the bolt E. A key blank $H^2$ is similarly held between the shoulder formed in the wall of the post and the lower edge of a like cap plate D. The spring F between the post and cap plate serves to release the key and blank upon unscrewing the respective bolts.

Figure 2:
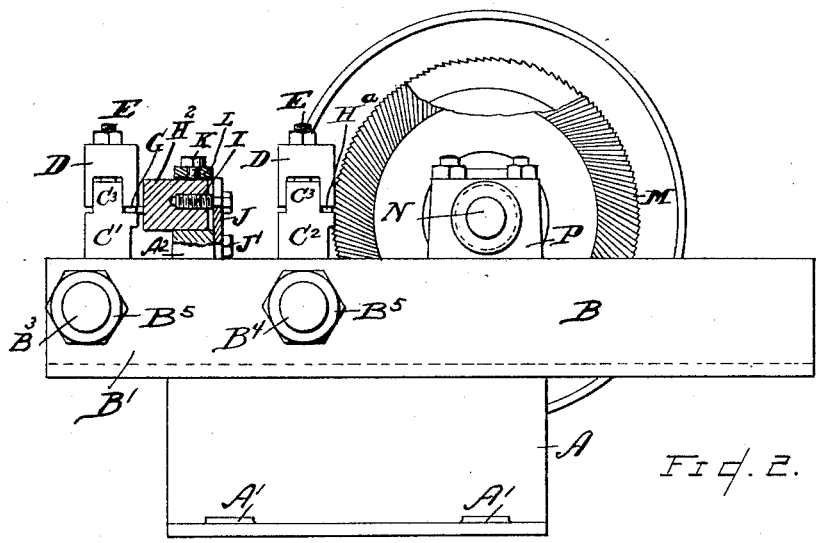
Figure 2 is an end elevation of the machine with a portion of one of the cutting wheels broken away that the teeth on the periphery and side of the cutting tool may be more clearly indicated. The view also shows the post of one of the stylus or guide members in section, to more clearly indicate the construction of this device.

Projecting upwardly from the bed frame A are posts $A^2$, $A^2$, $A^2$, for supporting a plurality of stylus or guide member H, $H^1$, $H^2$, respectively adapted to be adjusted upon its supporting post by bolts I—see Figure 2—extending through a slotted plate J, secured to the inner wall of the post by a bolt $J^1$. When the stylus has been properly adjusted with reference to the key and its co-operating cutting tool it may be secured against accidental displacement by a nut K, extending downwardly through a plate L, bolted to the top of the post A².

M, M¹, M², are rotary cutting tools mounted upon a screw threaded shaft N, supported in suitable bearings P, extending upwardly from the bed frame A. The threaded portion of the shaft however extends only between the bearings, as clearly shown in Figures 1 and 5 of the drawings,—in which the upper plate of the bearings has been removed. The cutting tools M, M¹, M², are secured to the shaft N in proper position by suitable nuts Q, Q, and washers Q^a, provided with a tongue or key (not shown) projecting into a longitudinal key-slot N^a in the shaft N,—see Figures 3 and 4.

N¹ and N² are driving pulleys mounted on the shaft N for operating the cutting tools at different speeds.

Having now indicated the several parts by reference letters the construction and operation of the machine will be readily understood.

For the purposes of this description it will be assumed that it is desired to duplicate an ordinary malleable door key such as are commonly employed for inside locks.

Figure 1:
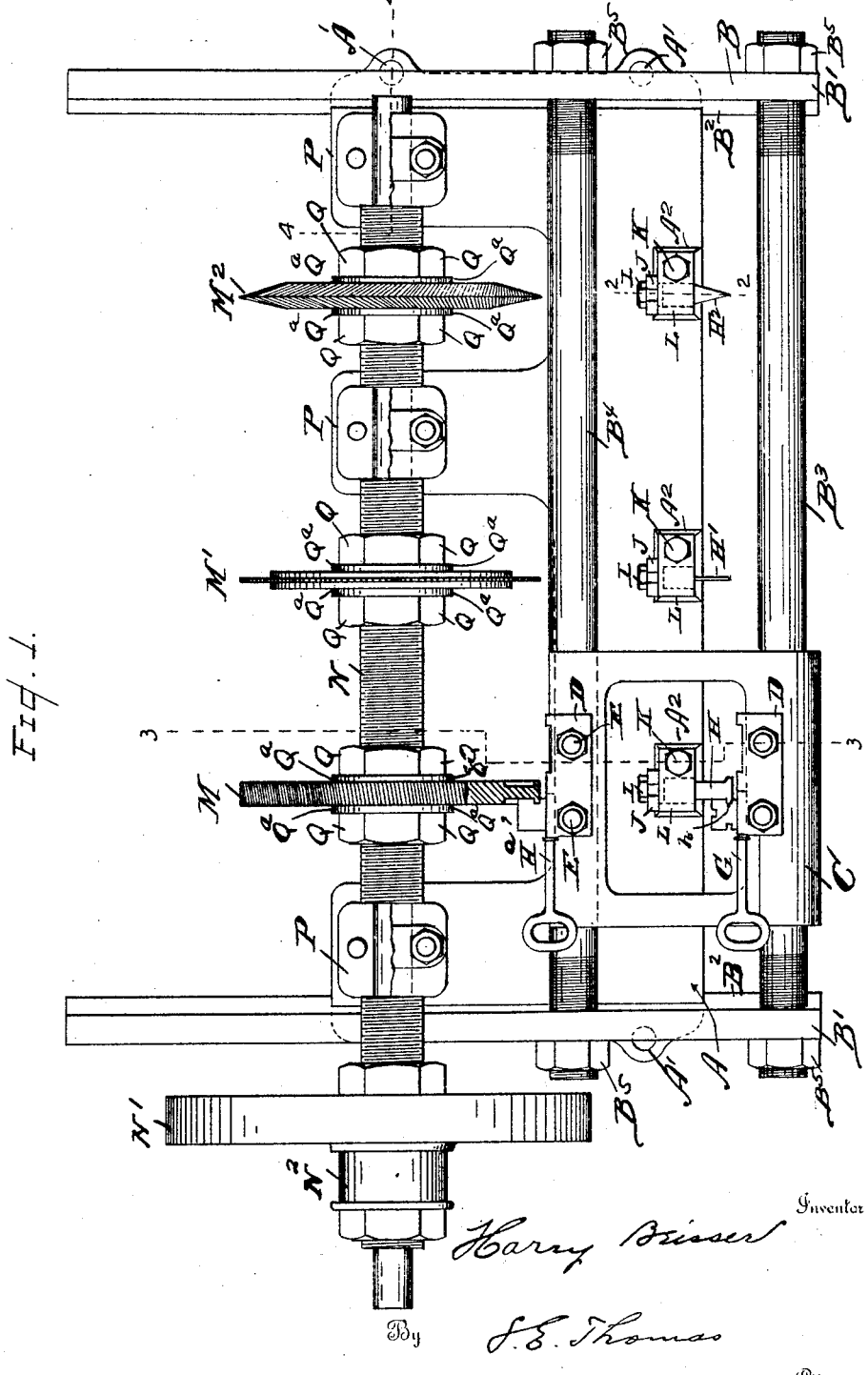
Figure 1 is a plan view of the machine, with parts broken away and in section to more clearly indicate the construction of certain elements of the device.

The master or template key is inserted in the clamping member as clearly shown in Figure 1, the clamping nuts being adjusted to secure it against displacement. The stylus or guide H which is mounted in a post directly in front of the cutting tool M is now adjusted so that its laterally projecting lug h will enter the recess in the bit of the master key. A key blank of proper form corresponding with the master key is now secured in the clamping member carried by the free end of the slidable carriage C, which is then manually pushed along the rods B³ until the key blank is brought into cutting relation with the flange cutting edge of the rotary tool M,—as shown in Figure 1,—toward which it is fed until the stylus reaches the full depth of the groove in the master key. The slidable carriage C carrying the master key and blank is then withdrawn from the cutter and stylus and the laterally movable frame B pulled out sufficiently to permit the carriage C with its master key and blank to pass in front of the cutting tool and stylus so that the stylus may register with the groove on the opposite side of the bit of the master key. The carriage C is then pushed back over the rods B toward the cutting tool as before explained until the groove on the opposite side in the blank is formed corresponding with that of the template whereupon it is again withdrawn from the cutting tool and the frame B pulled outwardly to permit the slidable carriage to pass on to the cutter M¹, whereupon the carriage with its master key is forced toward the stylus or guide H¹, which then enters the groove in the outer end of the key bit and simultaneously therewith, the rotary cutter M¹ forms a like groove in the key blank in the same respective relation as that in the outer end of the master key bit.

It will be readily understood that further adjustment of the stylus or guide members need not be made in grinding each individual key as when the grinding tool and coordinating stylus are once properly adjusted with reference to each other a further adjustment is not ordinarily necessary.

The key blank and master key being held in the same relation to each other as that existing between the stylus and its co-operating cutting tool, upon clamping the master key and corresponding blank in the slidable carriage C, the frames B and C may be adjusted so that the operator may guide the stylus into the grooves of the master key whereupon the cutting tool will simultaneously cut a like groove in the corresponding key blank. The respective guides or stylus points are designed especially for the usual types of key now upon the market, for example the stylus H, H¹, and cutting tools M, M¹, for the ordinary malleable key for inside locks, the cutting tool M¹ and stylus H¹ for flat keys, and the cutting tool M² and stylus H² for those of the so-called "Yale" type. It will be evident however that other forms of cutting tools and corresponding stylus points may be employed for other types of keys if required.

Having thus described my invention what I claim is:

1. In a key duplicating machine, a bed frame, a frame slidable laterally on the bed frame, spaced parallel rods mounted in the slidable frame, a carriage swingingly mounted on one of said rods and slidable over both of said rods, a plurality of spaced guide members mounted on the bed frame, a rotatable shaft journaled in the bed frame, a plurality of cutting devices carried by said shaft for cooperation with the respective guide members, a master key supported on the carriage for positioning with relation to the respective guide members, and a key blank supported on the carriage for positioning with relation to the respective cutting elements.

2. In a machine of the character described; a bed frame; a frame slidable transversely in the bed frame; parallel rods on the slidable frame; a carriage swingingly and slidably mounted upon the rods on the slidable frame, a pair of clamping members on the slidable frame adapted to support a template or master key and also a key blank in fixed relation to each other; a shaft journaled in the bed frame; a plurality of rotatable cutting tools mounted upon said shaft; driving pulleys mounted upon the shaft; a guide member supported upon the bed plate in fixed co-operating relation with each of the cutting tools, each guide member being adapted to enter recesses in a master key or template upon shifting the carriage with its master key in co-operating relation therewith, whereby recesses corresponding with those in the master key may be formed by the cutting tool in the key blank.

3. In a machine of the character described; a bed frame; a frame slidable transversely in the bed frame; a pair of rods on the slidable frame; a carriage pivotally mounted upon one of the rods and slidable on both rods, said carriage provided with a pair of clamping members adapted one to support a template or master key and the other clamping member supporting a key blank in fixed relation to the template or master key, a shaft journalled in the bed frame; a plurality of rotatable cutting tools adjustably mounted upon said shaft; driving pulleys mounted upon the shaft, and means carried by the bed frame for adjustably supporting a stylus or guide member in fixed relation to the respective cutting tools, whereby upon shifting the carriage to a position in front of the respective guide members the latter may enter the grooves in the master key that a similar groove may be formed by the respective cutting tool in the key blank mounted in the movable carriage.

4. In a machine of the character described, a bed frame, a frame transversely slidable in the bed frame, rods on the slidable frame, a carriage slidably mounted upon said rods, said carriage being pivoted to one of the rods whereby it may be tilted with reference to the rod upon which it normally rests, a shaft journalled in the bed frame, a plurality of rotatable cutting tools adjustably mounted upon said shaft, means carried by the bed frame for supporting a stylus in fixed relation to each of the cutting members, and means for securing an adjustment of said stylus.

5. In a key duplicating machine, a bed frame, a frame slidable on the bed frame, a pair of parallel rods on the slidable frame, a carriage slidably mounted upon said rods and also swingingly mounted on one of the rods and being free of the other rod whereby it may be tilted with reference to the rod upon which it normally rests, a shaft journalled in the bed frame, means on one side of the carriage for carrying a master key, means on the opposite side of the carriage for carrying a key blank, a cutting device carried by said shaft for action on the key blank, a guide member supported upon the bed frame for coaction with the master key whereby recesses corresponding with those in the master key may be formed by the cutting device in the key blank.

In testimony whereof, I sign this specification.

HARRY BEISSER.